United States Patent [19]

Uppaluri

[11] 4,423,612
[45] Jan. 3, 1984

[54] CANTILEVERED ROLL SHAFT BEARING BRACKET

[75] Inventor: Bapa R. Uppaluri, Sharon Hill, Pa.

[73] Assignee: Southwire Company, Ga.

[21] Appl. No.: 332,050

[22] Filed: Dec. 18, 1981

[51] Int. Cl.³ .................................................. B21B 31/02
[52] U.S. Cl. ................................................... 72/35; 72/237
[58] Field of Search ............... 72/35, 237, 244, 248, 72/456

[56] References Cited

U.S. PATENT DOCUMENTS 2,106,866  2/1938  Best ............................................ 72/35
3,587,267  6/1971  Townsend et al. ......................... 72/21
3,946,587  3/1976  Maltby ...................................... 72/237

Primary Examiner—Francis S. Husar
Assistant Examiner—Jorji M. Griffin
Attorney, Agent, or Firm—Herbert M. Hanegan; Stanley L. Tate; Michael C. Smith

[57] ABSTRACT

Apparatus for limiting ruinous rotary deflection and bending moment of roll shafts of a cantilevered type rolling mill. The present invention is a dual bearing bracket which connects the cantilevered ends of roll shafts in bearings to maintain constant parallel rotary alignment of the roll shafts. Thus, roll shaft service life is increased by limiting roll shaft deflection and bending moment.

7 Claims, 4 Drawing Figures

CANTILEVERED ROLL SHAFT BEARING BRACKET

TECHNICAL FIELD

The present invention relates generally to metal rolling, and specifically to a means for limiting cantilevered roll shaft deflection and associated problems in a cantilevered roll type rolling mill.

BACKGROUND ART

Cantilevered roll stands are well known in the art. Examples are shown in U.S. Pat. Nos. 3,257,835, 3,317,994, 3,296,682, 3,517,537, 3,672,199, 3,766,763, 3,881,336, 3,881,337, 4,087,898, 4,159,633, 4,193,823 and Re. 28,107. The main advantage of cantilevered roll mount over straddle roll mount is the fact that cantilevered work rolls are readily accessible and adjustable without dismantling a great portion of the roll stand. The main disadvantage of a cantilevered roll stand is the fact that each cantilevered work roll shaft is supported only on one side of the work roll, and as a result, cantilevered shafts tend to bend and deflect away from metal stock upon which their rolls work. As cantilevered shafts rotate, the work roll load application points and the direction of roll shaft deflection continuously change which causes the roll shafts to fatigue at an accelerated rate.

The industry has compensated somewhat for this deflection problem by using roll shafts of enormous size and great strength to transmit driving force to rolls which work comparatively meager metal stock. This strengthening and oversizing of roll shafts causes related components such as bearings to be more bulky and costly.

The present invention solves these problems by providing an apparatus which when mounted on the cantilevered ends of the roll shafts, mutually maintains the roll shafts in substantially parallel alignment and greatly reduces cantilevered roll shaft fatigue rate by limiting deflection.

DISCLOSURE OF INVENTION

The present invention is a dual bearing bracket comprising identical pillow block type bearing housings having reciprocal alignment means. Each is mounted and secured on the end of a cantilevered roll shaft, and secured to its partner, also mounted and secured on the end of a cooperating cantilevered roll shaft. As the securing bolts are equally tightened, each bearing housing draws toward the other until substantially parallel alignment of cooperating cantilevered roll shafts is assured, even while metal stock is being rolled.

Mathematical analysis of the present invention has shown that it reduces maximum cantilevered roll shaft bending moment of a given roll shaft by 450 percent and that it reduces maximum deflection of a given cantilevered roll shaft by 1060 percent.

A major object of the present invention is to provide an apparatus for reducing the fatigue rate of cantilever roll shafts of a rolling mill by limiting roll shaft bending moment and deflection.

Another object of the present invention is to provide an apparatus which will contribute to a more accurate bar path by maintaining the cantilevered work rolls in predetermined positions.

Still another object of the present invention is to provide an apparatus which will contribute to production of more symmetrical rod by limiting cantilevered roll shaft deflection.

Yet another object of the present invention is to provide an apparatus for limiting cantilevered roll shaft bending movement and deflection which will permit the use of smaller roll shafts to increase the service life of other roll stand components such as bearings by decreasing the load per bearing.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with accompanied drawings in which like parts are given like identification numerals and wherein:

BEST MODE FOR CARRING OUT THE INVENTION

Figure 1:
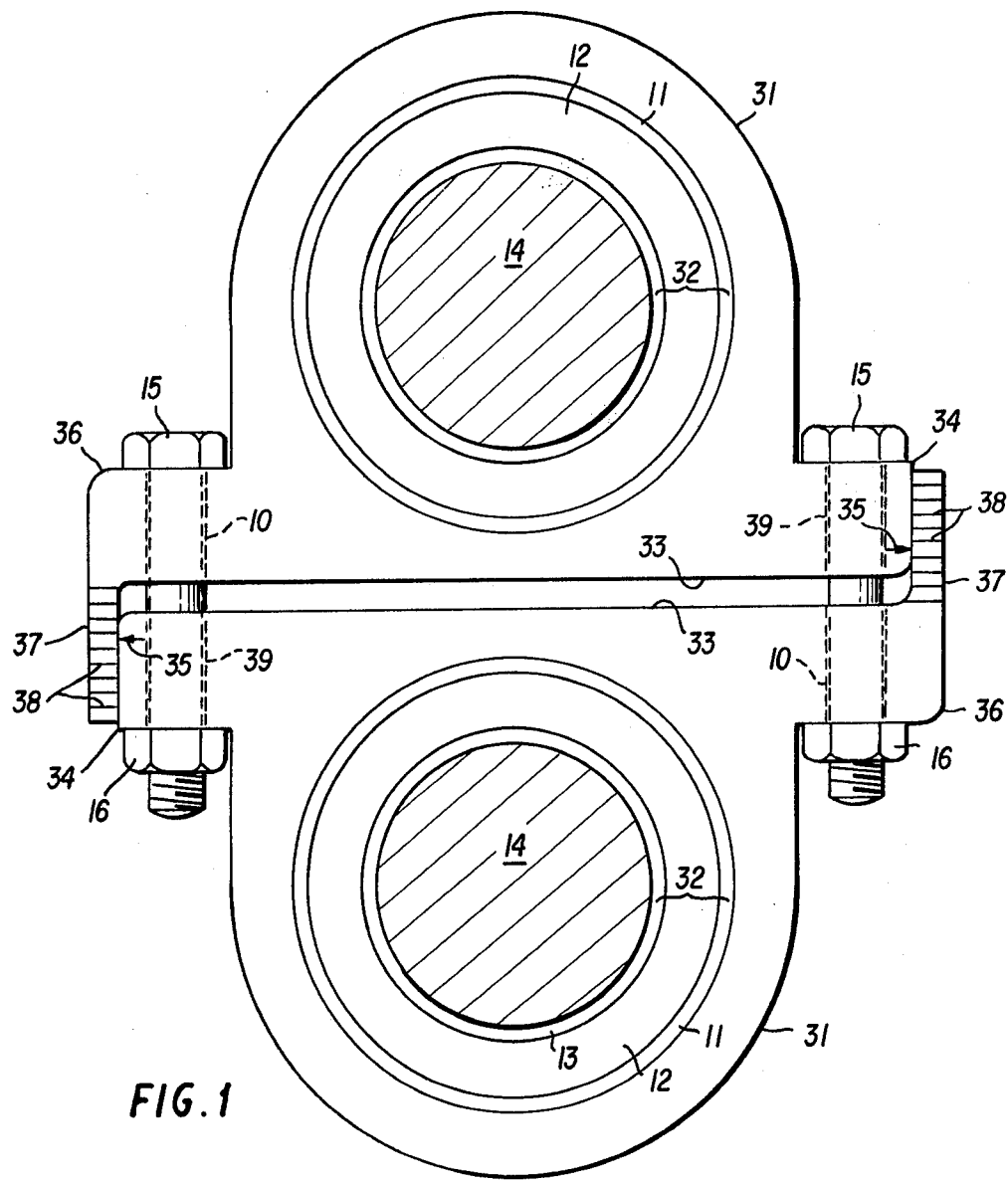
FIG. 1 is a front view of the preferred embodiment of the present invention and associated parts.

As FIG. 1 illustrates, the present invention comprises identical pillow block type bearing housings 31. Each bearing housing 31 is basically ring-like with its outer surface generally concentric to a bearing 32 housed therein.

A portion of the bearing housing 31 outer surface is a flat base 33 similar to the base of a pillow block. Base 33 extends generally perpendicular to the longitudinal axis of bearing 32. One shoulder 34 of base 33 extends past the circumference of the ring-like portion of the bearing housing 31 a distance sufficient to allow room for mounting means and then its face curves back towards the body of bearing housing 31. An alignment arrow 35 is located near the edge of shoulder 34. The opposite shoulder 36 of base 33 extends a distance equal to that of first shoulder 34 and then curves away from the main body of bearing housing 31 and extends perpendicular to base 33 for a short distance to form an alignment block 37. A number of alignment hash marks 38 are located on the outer surface of alignment block 37. Symmetrical bolt paths 39 and 10 are inscribed perpendicular to bases 33 in each shoulder 34 and 36 equidistant from the aperture in which the bearing 32 is housed.

Bearing 32 comprises an outer race 11 rigidly attached to bearing housing 31, rolling elements 12 mounted inside outer race 11 and an inner race 13 mounted interior of rolling elements 12 in such a manner that inner race 13 is rotatably secured to outer race 11.

The present invention is mounted on a cantilevered roll stand by pressing each bearing housing 31 onto the cantilevered end of a cantilevered work roll shaft 14 so that the inner surface of inner race 11 is adjacent to the outer surface of work roll shaft 14. The base 33 of each bearing housing 31 faces the base 33 of its partner bearing housing 31 with opposite shoulders 34 and 36 adjacent to each other. As outer surfaces of alignment arrow shoulders 34 contact inner surfaces of alignment blocks 37, bolt paths 39 and 10 align. Adjustment bolts 15 pass through paths 39 and 10 and adjustment nuts 16 attached thereto are tightened to draw bearing housings 31 together. Bases 33 are maintained in parallel alignment by evenly tightening adjustment nuts 16 based on the alignment of alignment arrows 35 and alignment hash marks 38. A caliper may be used to check the distance between cantilevered roll shafts 14 at various points to assure they are parallel.

Figure 2:
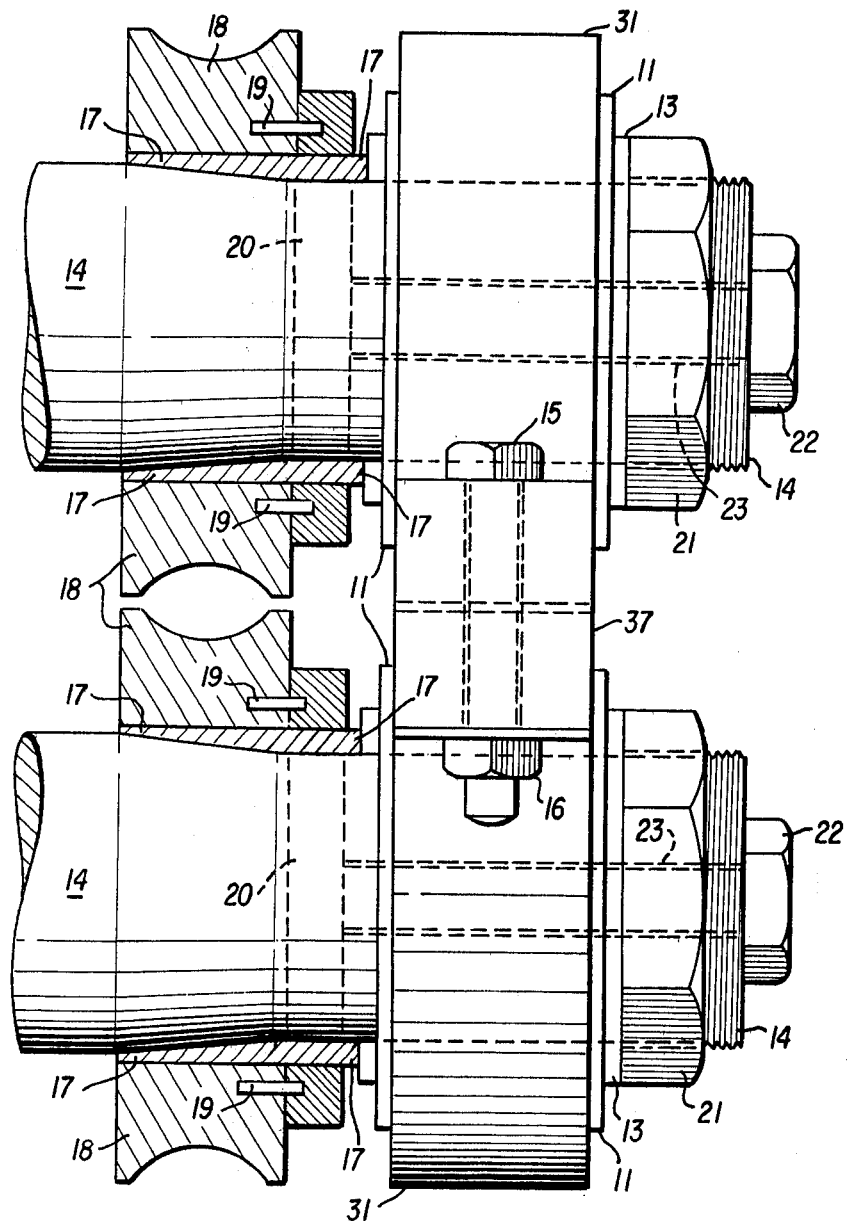
FIG. 2 is a side view of the preferred embodiment of the present invention with associated parts in cross section.

FIG. 2 is a cross sectional side view of the preferred embodiment which illustrates mounting of the preferred embodiment on cantilevered roll shafts 14. A taper sleeve 17 and a work roll 18 are pressed onto each roll shaft 14. Shear pins 19 are placed in apertures of said work rolls 18 and as cross keys 20 are mounted in roll shafts 14, shear pins 19 fit into corresponding apertures of cross keys 20. Cross key 20 is basically a bar which is inserted in a slot which passes through the diameter of roll shaft 14 to reach appropriate points on work roll 18. From the outward end of roll shaft 14 a threaded bolt path 23 extends along the axis of roll shaft 14 to the slot wherein cross key 20 is located. A cross key bolt 22 is screwed into this bolt path 23 and reaches a portion of cross key 20. By tightening cross key bolt 22, pressure is applied against cross key 20, locking cross key 20, shear pins 19, tapered sleeve 17, and work roll 18 in place. Bearing housings 31 and related components shown in FIG. 1 are mounted on work roll shafts 14 and aligned in the manner described above. A bearing housing lock nut 21 is threaded to each roll shaft 14 to secure bearing housings 31.

Figure 3:
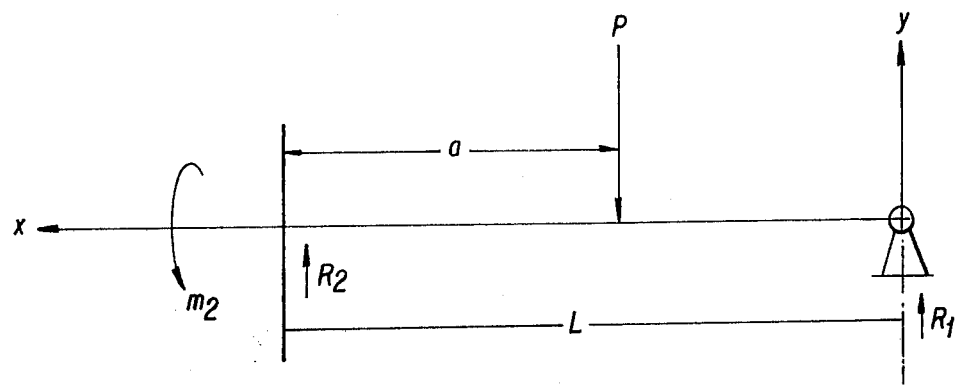
FIG. 3 and FIG. 4 are schematics of propped cantilevered and simple cantilevered mathematical models respectively.
Figure 4:
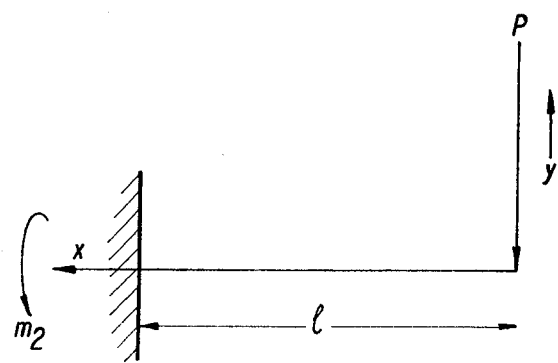

Mathematical analysis of the present invention has shown that it reduces maximum roll shaft bending moment by 450 percent and that it reduces maximum roll shaft deflection by 1060 percent. Similar analysis is discussed by Rothbart in *Mechanical Design And Systems Handbook* at pages 15 through 42. FIG. 3 is a mathematical model of the present invention wherein one end of the beam is fixed and one end of the beam is hinged. In FIG. 3, X equals the distance along the beam (or roll shaft) from the fixed end; $M_2$ equals bending moment at the fixed end; a equals the distance from the fixed end to the point of application of force; P equals force on the beam (force on the roll shaft at the rolls); Y equals deflection of the end of the beam at distance X; $R_1$ equals reaction at the hinged end; $R_2$ equals reaction at the fixed end; and L equals the span between the fixed end and the hinged end. FIG. 4 is a mathematical model of a prior art simple cantilevered beam (roll shaft). In FIG. 4, $m_2$ equals the bending moment at the fixed end; x equals the distance along the roll shaft from the fixed end; l equals the length of the FIG. 4 simple cantilevered beam (equivalent to the FIG. 3 improvement); l also equals $\frac{1}{2}$ L; P equals the force on the beam (force on the roll shaft at the rolls); and y equals deflection of the end of the beam at x. P is the force on the beam. Span L=kl where l is the length of the simple cantilever shaft, k is a factor $\frac{1}{2}$ l and gives the ratio of spans of supported and simple cantilever shafts. Reaction $R_1 = \frac{1}{2}P\,[(3a^2L - a^3)/L^3]$ and bending moment $M_2 = \frac{1}{2}P\,[(a^3 + 2aL^2 - 3a^2L)/L^2]$. If k=1.5 and a=1, then bending moment $M_2$ at the fixed end is $M_2=0.222$ Pl and reaction $R_2=0.4815P$. The bending moment M under load is found to be $M = R_1\,[L-a]$ or M=0.2592 Pl. Simple cantilever maximum bending moment is equal to Pl. Thus the maximum bending moment in the cantilever shaft is reduced 4.5 times by this apparatus which is about 0.222 of the maximum bending moment without this apparatus. The maximum deflection of the supported cantilever shaft occurs at X=0.567 l and can be shown to be Ymax = $(0.094)[(Pl^3)/(3EI)]$, while the maximum deflection of simple cantilever is Ymax = $(Pl^3)/(3EI)$. Thus the maximum deflection of a cantilever roll shaft supported by this apparatus is reduced 10.6 times which is about 0.094 of maximum deflection without this apparatus.

While this invention has been described in detail with particular reference to a preferred embodiment thereof, it will be understood that variations and modifications can be made effective within the spirit and scope of this invention as described hereinbefore and as defined in the appended claims.

INDUSTRIAL APPLICABILITY

This invention is capable of exploitation in the metal deforming industry. It is particularly useful in a system for continuously hot forming metal rod.

What I claim as the invention is:

1. Apparatus for limiting deflection and bending moment of cantilevered roll shafts of a cantilevered type rolling mill comprising mutually stabilized, adjustable bearing housings wherein a first bearing housing is mounted on the cantilevered end of a first cantilevered roll shaft and secured to a second cooperating bearing housing mounted on the cantilevered end of a second cantilevered roll shaft, such that said first roll shaft is substantially parallel to said second roll shaft.

2. The apparatus of claim 1 wherein said bearing housing further comprises:
   (a) housing means;
   (b) bearing means within said housing means;
   (c) interconnection means for interconnecting said first bearing housing to a second cooperating bearing housing; and
   (d) securement means for securing said bearing housing to said cantilevered roll shaft.

3. The apparatus of claim 2 wherein said housing means further comprises:
   a generally circular body having a bearing aperture inscribed therein for encasing said bearing means;
   a generally flat base at the outer portion of said body extending generally perpendicular to the longitudinal axis of said bearing aperture;
   a first shoulder breaking the generally circular profile of said body, extending remote from the longitudinal axis of said bearing aperture a distance sufficient to provide for attachment of said interconnection means at said shoulder and terminating at a first end of said base;
   a second shoulder breaking the generally circular profile of said body, extending remote from the longitudinal axis of said bearing aperture a distance sufficient to provide for attachment of said interconnection means, then extending generally away from said body perpendicular to said base and past said base forming an alignment block extension.

4. The apparatus of claim 3 further comprising:
   an interconnection means path inscribed through each of said shoulders equidistant from said bearing aperture and generally perpendicular to said base;
   alignment hash marks formed on the outer surface of said alignment block extension; and
   an alignment indicator formed on the outer surface of said first shoulder;

further provided that when a first housing means is connected to a second housing means with said bases facing each other and with alignment block extensions adjacent to said first shoulders, said bases are maintained in generally parallel alignment by equal positioning of said alignment indicators relative to said alignment hash marks, and said interconnection means paths align reciprocally.

5. The apparatus of claim 2 wherein said bearing means further comprises:
an outer race rigidly attached to said housing means within a bearing aperture of said bearing housing;
rolling elements mounted inside said outer race; and
an inner race rotatably mounted within said rolling elements in such a manner that said inner race is rotatably secured to said outer race.

6. The apparatus of claim 2 wherein said interconnecting means further comprises:
bolts passing through interconnection means paths inscribed within shoulders of said housing means; and
nuts threaded onto threaded portions of said bolts.

7. The apparatus of claim 2 wherein said securement means further comprises a nut tightened onto a threaded portion of each roll shaft pressing each bearing housing onto a roll shaft and retaining each bearing housing thereon.

* * * * *